US012785020B2

(12) United States Patent
Dai et al.

(10) Patent No.: US 12,785,020 B2
(45) Date of Patent: Nov. 3, 2026

(54) FIXING FRAME AND MAGNETIC LATCHING RELAY

(71) Applicant: Xiamen Hongfa Electric Power Controls Co., Ltd., Xiamen (CN)

(72) Inventors: Wenguang Dai, Xiamen (CN); Guojin Liao, Xiamen (CN); Shuming Zhong, Xiamen (CN)

(73) Assignee: XIAMEN HONGFA ELECTRIC POWER CONTROLS CO., LTD., Xiamen (CN)

( * ) Notice: Subject to any disclaimer, the term of this patent is extended or adjusted under 35 U.S.C. 154(b) by 53 days.

(21) Appl. No.: 18/668,126

(22) Filed: May 17, 2024

(65) Prior Publication Data

US 2024/0387138 A1 Nov. 21, 2024

(30) Foreign Application Priority Data

May 18, 2023 (CN) ........................ 202310568275.4

(51) Int. Cl.
*H01H 51/10* (2006.01)
*H01H 50/36* (2006.01)

(52) U.S. Cl.
CPC ............ *H01H 51/10* (2013.01); *H01H 50/36* (2013.01)

(58) Field of Classification Search
CPC ............................... H01H 51/10; H01H 50/36
USPC ................................................. 335/128–129
See application file for complete search history.

(56) References Cited

U.S. PATENT DOCUMENTS 3,163,738 A 12/1964 Farrell
4,323,945 A 4/1982 Sauer
4,625,191 A * 11/1986 Oberndorfer .......... H01H 3/001 335/121
4,933,654 A 6/1990 Hori et al.
6,426,689 B1 7/2002 Nakagawa et al.
6,475,019 B1 11/2002 Zielke et al.
(Continued)

FOREIGN PATENT DOCUMENTS

CN 103238198 A 8/2013
CN 204596720 U 8/2015
(Continued)

OTHER PUBLICATIONS

European Application No. 24176390.3, Extended European Search Report mailed Oct. 4, 2024, pp. 1-13.
(Continued)

*Primary Examiner* — Alexander Talpalatski
(74) *Attorney, Agent, or Firm* — Ashurst Perkins Coie US LLP

(57) ABSTRACT

A fixing frame for fixing at least a permanent magnet of a magnetic latching relay includes a body having shaft hole for installing a rotating shaft of a permanent magnet; at least one longitudinal limit part arranged on the body including two vertical limit columns arranged oppositely along a longitudinal direction, two vertical limit columns clamp a yoke of the magnetic latching relay and fit with the yoke without clearance in the longitudinal direction; and at least one transverse limit structure arranged on the body and fitted with a transverse fit structure of the magnetic latching relay without clearance in a transverse direction; wherein the transverse direction is perpendicular to the longitudinal direction.

12 Claims, 13 Drawing Sheets

(56) References Cited

U.S. PATENT DOCUMENTS

| | | | | |
|---|---|---|---|---|
| 8,203,403 | B2 * | 6/2012 | Moeller | H01H 51/2227 335/78 |
| 8,222,981 | B1 | 7/2012 | Zarbock et al. | |
| 9,916,954 | B2 | 3/2018 | Helmreich et al. | |
| 10,607,799 | B2 | 3/2020 | Kramer et al. | |
| 10,650,996 | B2 | 5/2020 | Hayashida et al. | |
| 2002/0135446 | A1 | 9/2002 | Takano et al. | |
| 2003/0073339 | A1 | 4/2003 | Zielke et al. | |
| 2008/0231397 | A1 | 9/2008 | Katou | |
| 2009/0033446 | A1 * | 2/2009 | Gruner | H01H 51/2281 335/129 |
| 2009/0033447 | A1 * | 2/2009 | Gruner | H01H 51/2281 335/189 |
| 2016/0284498 | A1 | 9/2016 | Zhang et al. | |
| 2018/0240631 | A1 | 8/2018 | Hayashida et al. | |
| 2019/0013172 | A1 | 1/2019 | Hayashida et al. | |
| 2021/0407754 | A1 | 12/2021 | Kitajima et al. | |
| 2022/0122792 | A1 | 4/2022 | Zhou | |
| 2022/0392725 | A1 | 12/2022 | Wei | |
| 2024/0387137 | A1 | 11/2024 | Dai et al. | |

FOREIGN PATENT DOCUMENTS

| | | | |
|---|---|---|---|
| CN | 106486324 | A | 3/2017 |
| CN | 106971912 | A | 7/2017 |
| CN | 106971913 | A | 7/2017 |
| CN | 206819939 | U | 12/2017 |
| CN | 206877912 | U | 1/2018 |
| CN | 206877914 | U | 1/2018 |
| CN | 206877922 | U | 1/2018 |
| CN | 208225812 | U | 12/2018 |
| CN | 109659199 | A | 4/2019 |
| CN | 208903935 | U | 5/2019 |
| CN | 110164737 | A | 8/2019 |
| CN | 110349811 | A | 10/2019 |
| CN | 209708908 | U | 11/2019 |
| CN | 210142625 | U | 3/2020 |
| CN | 111091987 | A | 5/2020 |
| CN | 211320483 | U | 8/2020 |
| CN | 111627758 | A | 9/2020 |
| CN | 211575481 | U | 9/2020 |
| CN | 211980527 | U | 11/2020 |
| CN | 212032959 | U | 11/2020 |
| CN | 212182232 | U | 12/2020 |
| CN | 212542290 | U | 2/2021 |
| CN | 112542355 | A | 3/2021 |
| CN | 212786153 | U | 3/2021 |
| CN | 112750663 | A | 5/2021 |
| CN | 112967906 | A | 6/2021 |
| CN | 213519779 | U | 6/2021 |
| CN | 214068646 | U | 8/2021 |
| CN | 214542039 | U | 10/2021 |
| CN | 113782392 | A | 12/2021 |
| CN | 215451293 | U | 1/2022 |
| CN | 216122877 | U | 3/2022 |
| CN | 216528650 | U | 5/2022 |
| CN | 216902697 | U | 7/2022 |
| CN | 217158052 | U | 8/2022 |
| CN | 115631974 | A | 1/2023 |
| CN | 218299710 | U | 1/2023 |
| CN | 218385011 | U | 1/2023 |
| CN | 218385017 | U | 1/2023 |
| CN | 218385018 | U | 1/2023 |
| CN | 218385019 | U | 1/2023 |
| CN | 218385020 | U | 1/2023 |
| CN | 218385036 | U | 1/2023 |
| CN | 218385037 | U | 1/2023 |
| CN | 218385041 | U | 1/2023 |
| CN | 218385042 | U | 1/2023 |
| CN | 218385043 | U | 1/2023 |
| CN | 218631843 | U | 3/2023 |
| CN | 218730704 | U | 3/2023 |
| CN | 218996617 | U | 5/2023 |
| CN | 219873356 | U | 10/2023 |
| CN | 220041714 | U | 11/2023 |
| CN | 220041735 | U | 11/2023 |
| CN | 117727602 | A | 3/2024 |
| CN | 117877930 | A | 4/2024 |
| CN | 117912891 | A | 4/2024 |
| CN | 117912892 | A | 4/2024 |
| CN | 117912893 | A | 4/2024 |
| CN | 117912896 | A | 4/2024 |
| CN | 117912897 | A | 4/2024 |
| CN | 117912898 | A | 4/2024 |
| CN | 117912899 | A | 4/2024 |
| CN | 117912900 | A | 4/2024 |
| CN | 118136454 | A | 6/2024 |
| DE | 112015006404 | T5 | 12/2017 |
| EP | 1843377 | A1 | 10/2007 |
| EP | 1843377 | B1 | 3/2009 |
| EP | 2822011 | A1 | 1/2015 |
| EP | 2827354 | A1 | 1/2015 |
| EP | 2551868 | B1 | 2/2015 |
| EP | 3608938 | A1 | 3/2018 |
| EP | 3608938 | B1 | 3/2022 |
| EP | 4354479 | A1 | 4/2024 |
| JP | 50-158162 | U | 12/1975 |
| JP | 57-113532 | A | 7/1982 |
| JP | H01220323 | A | 9/1989 |
| JP | 2006059702 | A | 3/2006 |
| JP | 2012022982 | A | 2/2012 |
| JP | 2012104362 | A | 5/2012 |
| JP | 2012199122 | A | 10/2012 |
| JP | 2013030310 | A | 2/2013 |
| JP | 2014505345 | A | 2/2014 |
| JP | 2015060748 | A | 3/2015 |
| JP | 2015079672 | A | 4/2015 |
| JP | 2015127996 | A | 7/2015 |
| JP | 5773006 | B1 | 9/2015 |
| JP | 5930094 | B1 | 6/2016 |
| JP | 2016194984 | A | 11/2016 |
| JP | 2019032945 | A | 2/2019 |
| JP | 2019192545 | A | 10/2019 |
| JP | 2022139817 | A | 9/2022 |
| KR | 20140138591 | A | 12/2014 |
| KR | 20240166941 | A | 11/2024 |
| WO | 2006006557 | A1 | 1/2006 |
| WO | 2015125319 | A1 | 8/2015 |
| WO | 2018177428 | A1 | 10/2018 |
| WO | 2019026945 | A1 | 2/2019 |
| WO | 2022127627 | A1 | 6/2022 |
| WO | 2022/262851 | A1 | 12/2022 |
| WO | 2024078418 | A1 | 4/2024 |
| WO | 2024078421 | A1 | 4/2024 |
| WO | 2024078423 | A1 | 4/2024 |
| WO | 2024078424 | A1 | 4/2024 |
| WO | 2024078455 | A1 | 4/2024 |
| WO | 2024078461 | A1 | 4/2024 |
| WO | 2024078537 | A1 | 4/2024 |
| WO | 2024078539 | A1 | 4/2024 |
| WO | 2024078542 | A1 | 4/2024 |
| WO | 2024078543 | A1 | 4/2024 |

OTHER PUBLICATIONS

European Application No. 24176392.9, Extended European Search Report mailed Oct. 15, 2024, pp. 1-14.

European Application No. 24176665.8, Extended European Search Report mailed Oct. 15, 2024, pp. 1-42.

European Application No. 24176368.9, Extended European Search Report mailed Oct. 4, 2024, pp. 1-7.

Office Action from related corresponding Japanese Application No. 2024-081166, dated Apr. 30, 2025.

Office Action from related corresponding Japanese Application No. 2024-081279, dated Jun. 17, 2025.

Office Action from related corresponding Japanese Application No. 2024-081318, dated Jun. 24, 2025.

Office Action from related corresponding Chinese Patent Application No. 202310565273.X, dated Aug. 30, 2025.

Office Action from related corresponding Chinese Patent Application No. 202310568275.4, dated Jul. 25, 2025.

(56) References Cited

OTHER PUBLICATIONS

Office Action from related corresponding Chinese Patent Application No. 202310568284.3, dated Aug. 1, 2025.
Notice of Allowance from related corresponding European Patent Application No. 24176368.9, dated Jul. 17, 2025.
Notice of Allowance from related corresponding Japanese Patent Application No. 2024-081166, dated Oct. 7, 2025.
Notice of Allowance from related corresponding Korean Patent Application No. 20-2024-0000880, dated Jul. 25, 2025.
Notice of Allowance from related corresponding Korean Patent Application No. 10-2024-0064770, dated Mar. 13, 2026.
Notice of Allowance from related corresponding U.S. Appl. No. 18/666,360, dated Apr. 8, 2026.
Office Action from related corresponding Chinese Patent Application No. 2023105682843, dated May 1, 2026.
Office Action from related corresponding Japanese Patent Application No. 2024-081279, dated Nov. 18, 2025.
Office Action from the related corresponding U.S. Appl. No. 18/668,124, dated Jun. 29, 2026.

* cited by examiner

B-B

FIXING FRAME AND MAGNETIC LATCHING RELAY

CROSS-REFERENCE TO RELATED APPLICATION(S)

This application is based upon and claims priority to Chinese Patent Application No. 202310568275.4, filed on May 18, 2023, the entire contents thereof are incorporated herein by reference.

TECHNICAL FIELD

The present disclosure relates to the field of relay technology, and in particular to a fixing frame and a magnetic latching relay.

BACKGROUND

The magnetic latching relay is an automatic switch that switches the circuit on and off. The magnetic latching relay includes a base, a permanent magnet, an armature on both sides of the permanent magnet, a fixing frame and a yoke. The permanent magnet is located on the base and has a rotating shaft. When a pulse voltage is applied to the magnetic latching relay, the rotating shaft of the permanent magnet rotates, driving the armature to swing, causing the armature to overlap the yoke. The fixing frame is used to fix the permanent magnet to the base. In order to ensure that the rotating shaft can rotate flexibly, the fixing frame is provided with a shaft hole for the rotating shaft to pass through.

The fixing frame has a fixed post. When the permanent magnet is fixed, the fixed post of the fixing frame is inserted into the corresponding hole on the base, and the rotating shaft of the permanent magnet passes through the shaft hole of the fixing frame. However, due to the complex structure of the base, the injection molding of the base may be uneven during the manufacturing process. The fixed posts cannot be completely vertically inserted into the holes in the base, causing the fixing frame to become dislocated. This causes stress to be generated between the shaft hole and the rotating shaft of the permanent magnet, affecting the rotation of the rotating shaft, which affects the swing of the armature, resulting in poor overlap between the armature and the yoke, which affects the electrical performance of the relay.

The above information disclosed in the background is only for enhancement of understanding of the background of the disclosure and therefore it may contain information that does not form the related art that is already known to a person of ordinary skill in the art.

SUMMARY

In one aspect of present disclosure, a fixing frame for fixing at least a permanent magnet of a magnetic latching relay includes:

a body having a first surface and a second surface opposite to the first surface, and a shaft hole penetrating the first surface and the second surface, a rotating shaft of the permanent magnet being rotatably installed in the shaft hole;

at least one longitudinal limit part arranged on the body; the longitudinal limit part including two vertical limit columns arranged oppositely along a longitudinal direction, the vertical limit column protrudes from the first surface away from the second surface, the two vertical limit columns are configured to clamp a yoke of the magnetic latching relay, and fit with the yoke without clearance in the longitudinal direction; and at least one transverse limit structure arranged on the body, and the transverse limit structure is configured to fit with a transverse fit structure of the magnetic latching relay without clearance in a transverse direction;

wherein the transverse direction is perpendicular to the longitudinal direction.

According to some embodiments of the present disclosure, wherein the transverse fit structure includes an installation hole on a base of the magnetic latching relay, the transverse limit structure includes a transverse limit part, the transverse limit part is located on one side of the body along the longitudinal direction; the transverse limit part protrudes from the first surface away from the second surface, the transverse limit part is configured to be plugged into the installation hole and fit with the installation hole without clearance in the transverse direction.

According to some embodiments of the present disclosure, wherein the transverse fit structure includes a protrusion located on the yoke of the magnetic latching relay, when the fixing frame is installed on the magnetic latching relay, the protrusion protrudes toward the fixing frame; the transverse limit structure includes a through hole that penetrates the first surface and the second surface, and the through hole is adjacent to the longitudinal limit part, the protrusion is configured to fit in the through hole without clearance in the transverse direction.

According to some embodiments of the present disclosure, wherein the number of the longitudinal limit part is one, the longitudinal limit part is provided on one side of the body in the transverse direction.

According to some embodiments of the present disclosure, wherein the number of the longitudinal limit parts is two, and two longitudinal limit parts are located on opposite sides of the body in the transverse direction, two longitudinal limit parts are configured to respectively clamp two yokes oppositely arranged of the magnetic latching relay, and fit with the yoke without clearance in the longitudinal direction.

According to some embodiments of the present disclosure, wherein the number of the transverse limit parts is multiple, and the multiple transverse limit parts are located at one side of the body in the longitudinal direction, and the multiple transverse limit parts are arranged along the transverse direction; the number of the transverse limit parts is configured to be less than or equal to the installation holes on the base of the magnetic latching relay.

According to some embodiments of the present disclosure, wherein a size of the transverse limit part along the longitudinal direction is configured to be smaller than a size of the installation hole of the base along the longitudinal direction size.

According to some embodiments of the present disclosure, wherein the body also has a through hole and a glue dispensing port respectively penetrating the first surface and the second surface, wherein the through hole is adjacent to the longitudinal limit part, and the glue dispensing port is adjacent to the transverse limit part.

According to some embodiments of the present disclosure, wherein the body is T-shaped and includes a transverse portion extending along the transverse direction and a longitudinal portion extending along the longitudinal direction from a middle of the transverse portion;

the longitudinal limit part is located on the transverse portion, and the transverse limit part is located on the longitudinal portion.

In another aspect of present disclosure, a magnetic latching relay includes:

a base;

a permanent magnet installed on the base, the permanent magnet having a rotating shaft;

two yokes fixedly installed on the base and located on opposite sides of the permanent magnet;

a transverse fit structure located on the yoke; and a fixing frame, including:

a body having a first surface and a second surface opposite to the first surface, and a shaft hole penetrating the first surface and the second surface, a rotating shaft of the permanent magnet being rotatably installed in the shaft hole;

at least one longitudinal limit part arranged on the body; the longitudinal limit part including two vertical limit columns arranged oppositely along a longitudinal direction, the vertical limit column protrudes from the first surface away from the second surface, the two vertical limit columns are configured to clamp a yoke of the magnetic latching relay, and fit with the yoke without clearance in the longitudinal direction; and at least one transverse limit structure arranged on the body, and the transverse limit structure is configured to fit with a transverse fit structure of the magnetic latching relay without clearance in a transverse direction;

wherein the transverse direction is perpendicular to the longitudinal direction.

According to some embodiments of the present disclosure, wherein the transverse fit structure includes an installation hole on a base of the magnetic latching relay and a transverse limit part, the transverse limit part is located on one side of the body along the longitudinal direction; the transverse limit part protrudes from the first surface away from the second surface, the transverse limit part is configured to be plugged into the installation hole and fit with the installation hole without clearance in the transverse direction.

According to some embodiments of the present disclosure, wherein the transverse fit structure includes a protrusion located on the yoke, and the protrusion protrudes toward the fixing frame;

the transverse limit structure includes a through hole that penetrates the first surface and the second surface, the through hole is adjacent to the longitudinal limit part, the protrusion fits in the through hole without clearance in the transverse direction.

BRIEF DESCRIPTION OF THE DRAWINGS

The above and other features and advantages of the present disclosure will become more apparent by describing in detail example embodiments thereof with reference to the accompanying drawings.

Figure 1:
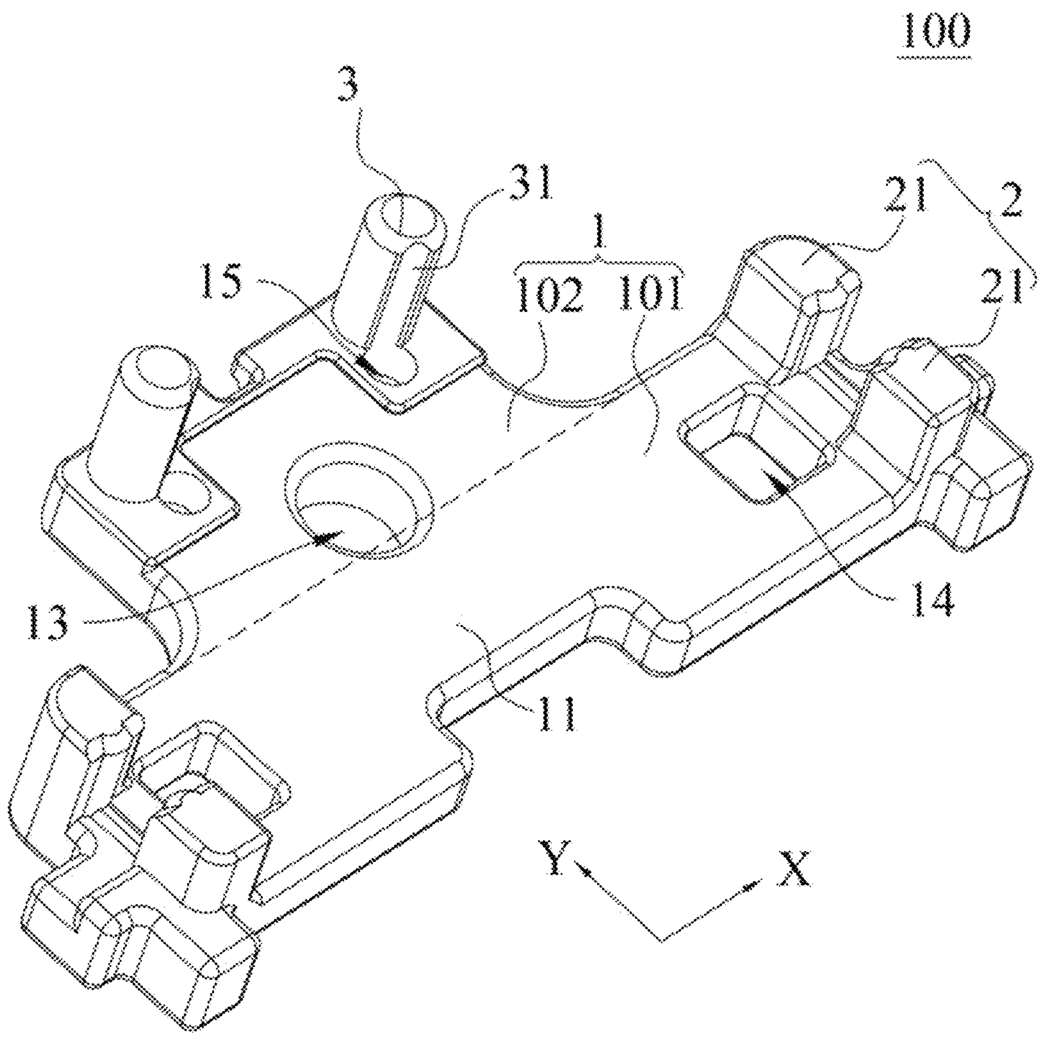
FIG. 1 is a three-dimensional view of the fixing frame shown in some embodiments of the present disclosure.

wherein, the reference numerals are listed as follows:

100. fixing frame, 1. body, 11. first surface, 12. second surface, 13. shaft hole, 14. through hole, 15. glue dispensing port, 101. transverse portion, 102. longitudinal portion, 2. longitudinal limit part, 21. vertical limit column, 3. transverse limit part, 31. guiding channel, 200, base, 201, installation hole, 300. permanent magnet, 301. rotating shaft, 400. yoke, 401. protrusion, 500. armature, 600. swing arm, 700. push card, 800. movable contact assembly, 900. coil assembly, 901. bobbin, 902. coil, X. transverse direction, Y. longitudinal direction.

DETAILED DESCRIPTION

Example embodiments will now be described more fully with reference to the accompanying drawings. Example embodiments may, however, be embodied in various forms and should not be construed as limited to the embodiments set forth herein; rather, these embodiments are provided so that this disclosure will be thorough and complete, and will fully convey the concepts of the example embodiments. To those skilled in the art. The same reference numerals in the drawings indicate the same or similar structures, and thus their detailed descriptions will be omitted.

Figure 7:
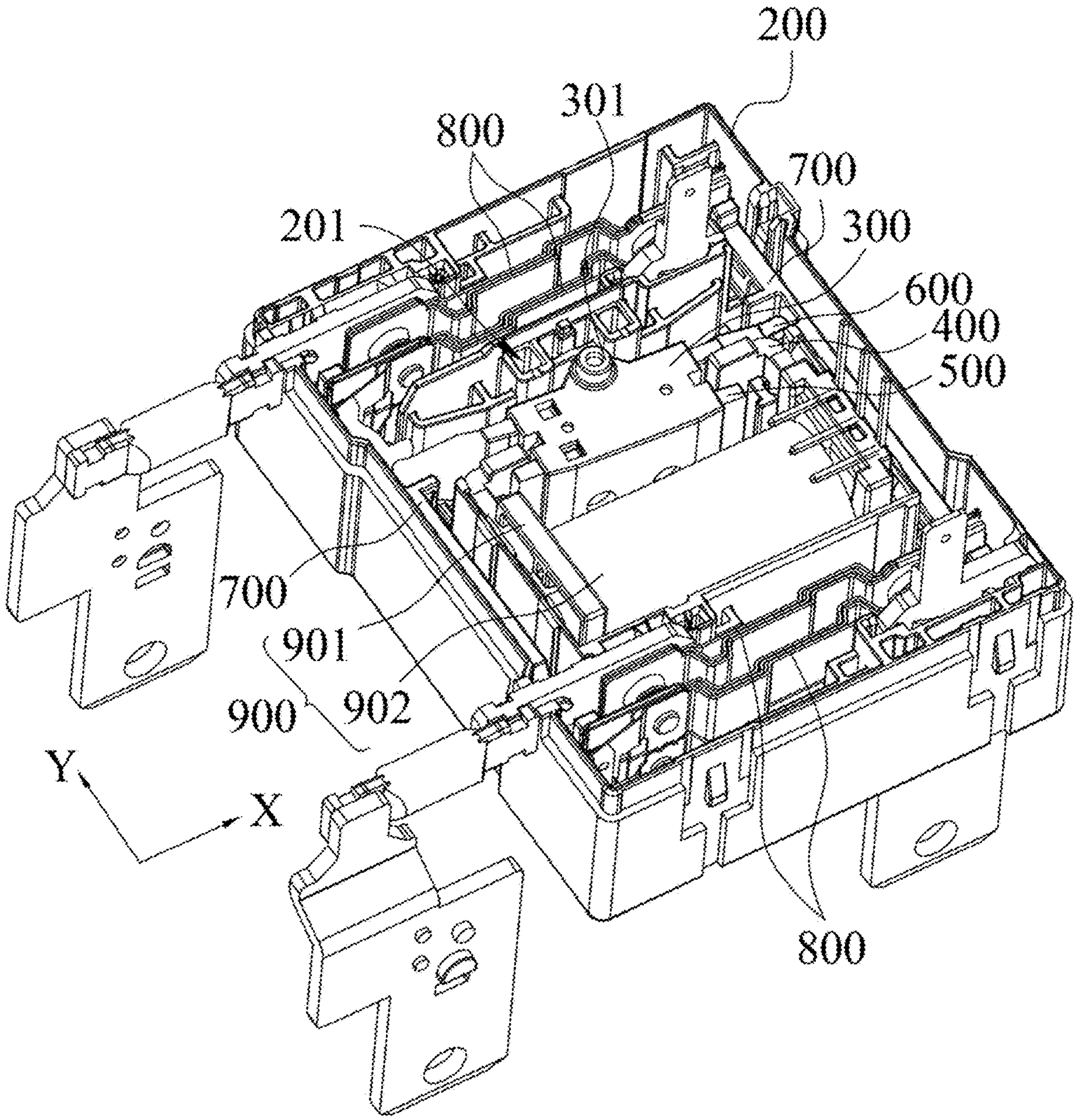
FIG. 7 is a three-dimensional view of the magnetic latching relay (with the fixing frame removed) shown in some embodiments of the present disclosure.

In order to facilitate the description, the structure of the magnetic latching relay is briefly described firstly. As shown in FIG. 7, a three-dimensional view of the magnetic latching relay is shown. The magnetic latching relay includes a base 200 and a coil assembly 900, a yoke 400, an armature 500, a permanent magnet 300, a push card 700 and a movable contact assembly 800 located on the base 200.

Wherein, the coil assembly 900 includes an iron core (not shown in the figure), a bobbin 901 and a coil 902. The coil 902 is wound around the outer surface of the bobbin 901, and the iron core is placed inside the bobbin 901. The yoke 400 is fixed on the base 200. There are two yokes 400, which are located at both ends of the bobbin 901 and are in contact with the iron core. The permanent magnet 300 is located on one side of the coil assembly 900. The permanent magnet 300 has a rotating shaft 301. One end of the rotating shaft 301 penetrates a shaft hole (not shown in the figure) on the base 200, and the other end penetrates a shaft hole 13 on the fixing frame 100 (refer to FIG. 8), which enables the rotating shaft 301 to rotate in the two shaft holes. The armature 500 is connected to both sides of the permanent magnet 300. A swing arm 600 is also provided on both sides of the permanent magnet 300, and the swing arm 600 can cooperate with the push card 700 located on both sides.

When a forward pulse voltage is applied to the coil 902, the rotating shaft 301 of the permanent magnet 300 rotates, causing the permanent magnet 300 to swing to one side, and at the same time driving the armature 500 to swing, so that the armature 500 overlaps the yoke 400 at one side to form a complete magnetic field. At the same time, the permanent magnet 300 drives the swing arm 600 to swing, and the swing arm 600 drives the push card 700 to move, further push the movable contact piece of the movable contact assembly 800 to move. Thus, the movable contacts and the static contacts are in contact with each other, the relay is closed, and the external circuit is turned on. When the coil 902 is powered off, the permanent magnet 300 can maintain the magnetic field, that is, that is, it can maintain the position of the swing arm 600, thereby keeping the movable contact and the static contact closed.

When a reverse pulse voltage is supplied to the coil 902, the rotating shaft 301 of the permanent magnet 300 rotates in the opposite direction, causing the permanent magnet 300 to swing to the other side, and at the same time driving the armature 500 to swing to the other side, so that the armature 500 is disconnected from the yoke 400 that was originally overlapped at one side, and overlapped with the yoke 400 at the other side to form another complete magnetic field. At the same time, the permanent magnet 300 drives the swing arm 600 to swing, and the swing arm 600 drives the push card 700 to move in the opposite direction, and the push card 700 pull the movable contact piece of the movable contact assembly 800 to move. so that the movable contacts and static contacts of 800 are disconnected, the relay is disconnected, and the external circuit is disconnected. When the coil 902 is powered off, the permanent magnet 300 can maintain the magnetic field, that is, it can maintain the position of the swing arm 600, thereby maintaining the disconnection of the movable contact and the static contact.

In order to ensure the stability of the permanent magnet 300 installed on the base 200, the fixing frame 100 is needed to fix the permanent magnet 300. The fixing frame 100 is provided with connecting posts, and the base 200 is provided with installation holes corresponding to the connecting posts. As long as the connecting posts of the fixing frame 100 are plugged into the corresponding installation holes, fixation of permanent magnet 300 can be realized. However, it was found during the study that due to the complex structure of the base 200, uneven injection molding may occur during the manufacturing process of the base 200, resulting in variations in the size, shape or position of the installation hole on the base 200. Due to a slight deviation, the connecting column on the fixing frame 100 cannot be vertically and accurately inserted into the installation hole. That is, after the connecting column is inserted into the installation hole, the fixing frame 100 may be dislocated, causing the fixing frame 100 to be misaligned. Stress is generated between the shaft hole 13 of the permanent magnet 300 and the rotating shaft 301 of the permanent magnet 300, which affects the normal rotation of the rotating shaft 301, which affects the swing of the armature 500, resulting in poor overlap between the armature 500 and the yoke 400, or the overlap is unstable, which affects the formation of the magnetic field, thereby affecting the electrical performance of the relay. At the same time, it will also affect the swing of the swing arm 600 of the permanent magnet 300, making the push card 700 unable to accurately push the movable contact piece, affecting the closing and disconnecting of the relay.

Figure 2:
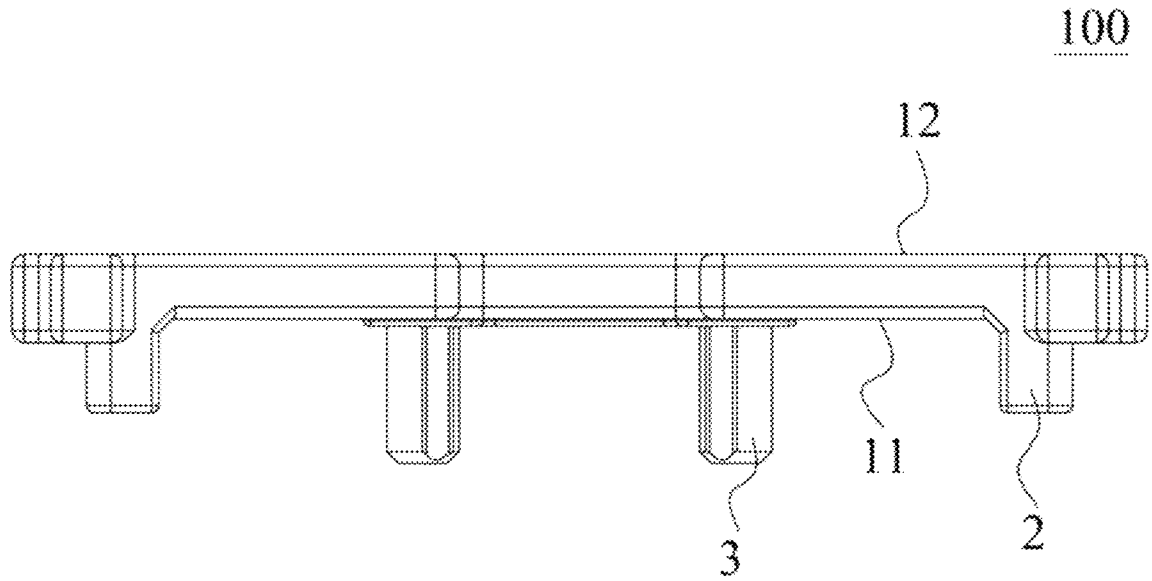
FIG. 2 is a schematic top view of the fixing frame shown in some embodiments of the present disclosure.
Figure 3:
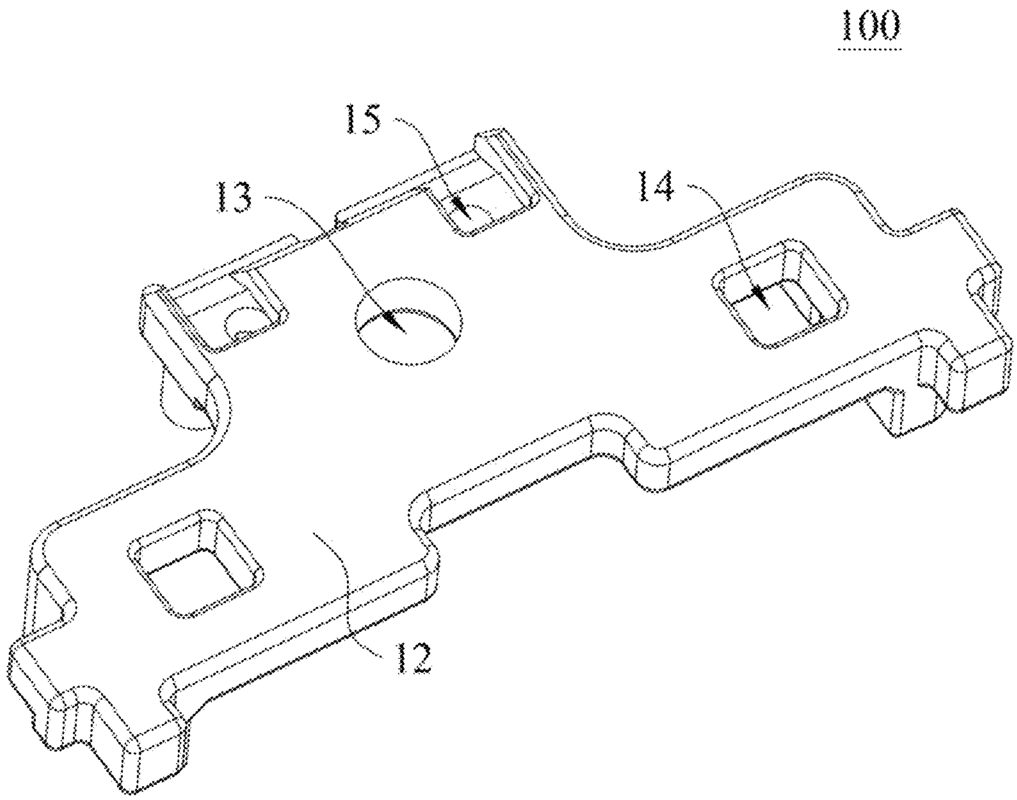
FIG. 3 is a three-dimensional view of the fixing frame shown in some embodiments of the present disclosure.

Based on this, as shown in FIGS. 1 to 3, an embodiment of the present disclosure provides a fixing frame 100, including a body 1, at least one longitudinal limit part 2 and at least one the transverse limit structure.

Among them, as shown in FIGS. 2 and 7, the body 1 has a first surface 11 and a second surface 12 that are opposite to each other. As shown in FIG. 3, the body 1 also has a shaft hole 13 penetrating the first surface 11 and the second surface 12. The shaft hole 13 is configured to install the rotating shaft 301 of the permanent magnet 300, so that the rotating shaft 301 can rotate in the shaft hole 13.

In some embodiments, as shown in FIG. 1, the body 1 is T-shaped, and including a transverse portion 101 extending along the transverse direction X and a longitudinal portion 102 extending along the longitudinal direction Y (shown as a dotted line in FIG. 1 separated), the longitudinal portion 102 extends from the middle of the transverse portion 101 along the longitudinal direction Y. The longitudinal limit part 2 is located at the transverse portion 101, and the transverse limit part 3 is located at the longitudinal portion 102.

It should be noted that the transverse direction X can be understood as an extension direction of the horizontal part in the T-shape, and the longitudinal direction Y can be understood as an extension direction of the vertical part in the T-shape. The transverse direction X is perpendicular to the longitudinal direction Y. Among them, directions of the transverse direction and the longitudinal direction are for convenience of describing the structure of the fixing frame 100 and do not have a limiting meaning. In addition, the body 1 is T-shaped, which is not strictly T-shaped. The outline of the body 1 can be roughly T-shaped, as shown in FIGS. 3 to 6.

In some embodiments, as shown in FIGS. 1 and 4 to 6, the longitudinal limit part 2 is distributed from one side of the body 1 in the transverse direction X to the opposite side. The longitudinal limit part 2 includes two vertical limit columns 21 arranged oppositely along the longitudinal direction Y. The vertical limit column 21 protrudes from the first surface 11 in a direction away from the second surface 12. The two vertical limit columns 21 are configured to clamp the yoke 400 of the magnetic latching relay, and to fit with the yoke 400 without clearance in the longitudinal direction Y. The word fit without clearance in the embodiment of the present disclosure refers to an interference fit or a fit with zero clearance.

In some embodiments, the number of the longitudinal limit part 2 is one and is located at one side of the body 1 in the transverse direction X. Since the longitudinal limit part 2 can fit with the yoke 400 without clearance in the longitudinal direction Y, a longitudinal limit part 2 can be set up, and the longitudinal limit part 2 can clamp to a yoke 400 on the magnetic latching relay, and can ensure that the fixing frame 100 is positioned in the longitudinal direction Y.

Figure 9:
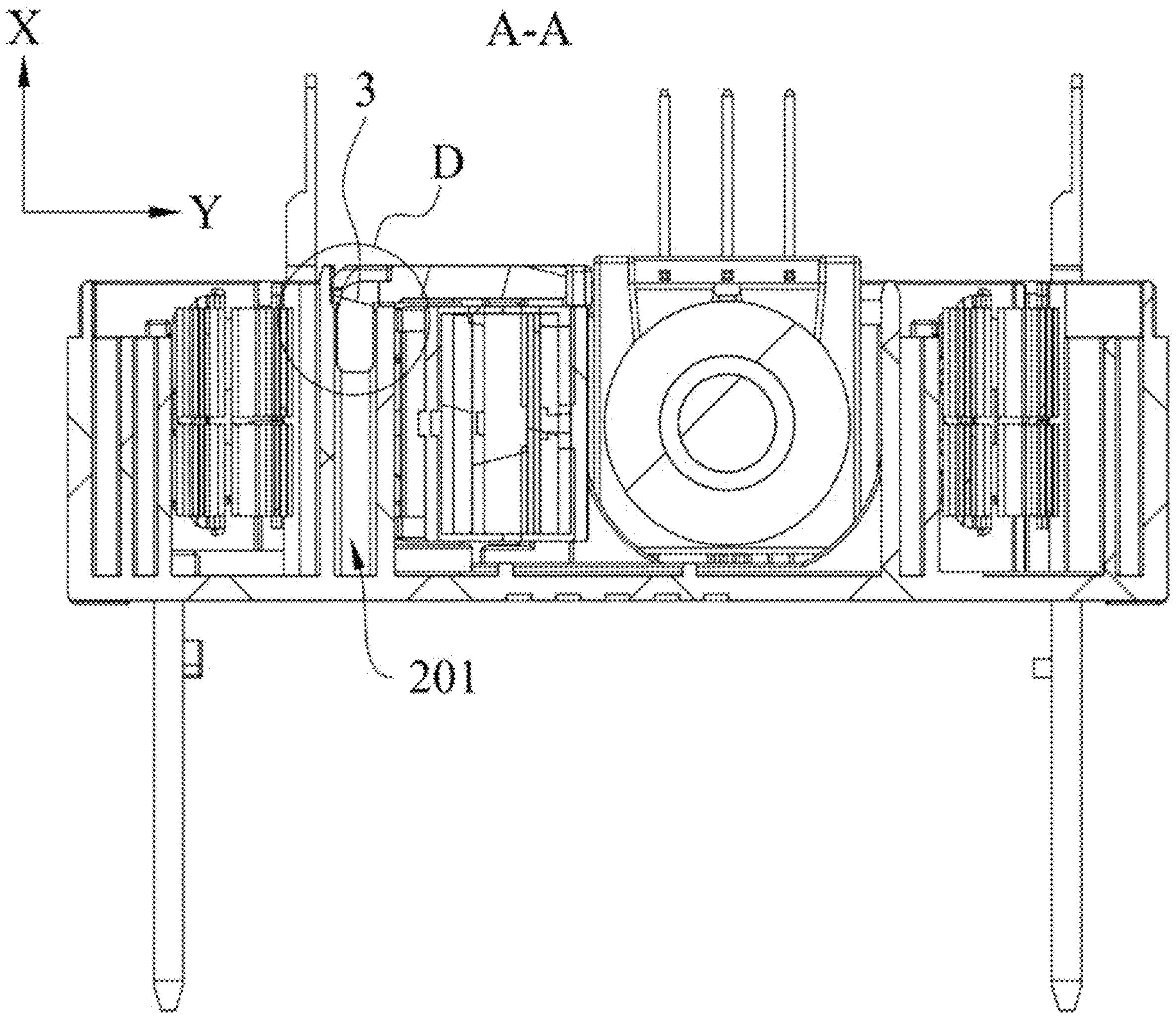
FIG. 9 is a schematic cross-sectional view along A-A in FIG. 8.

In some embodiments, as shown in FIG. 1, the number of the longitudinal limit parts 2 is two, located on opposite sides of the body 1 along the transverse direction X. As shown in FIG. 9, the two longitudinal limit part 2 is configured to clamp the two oppositely arranged yoke 400 of the magnetic latching relay, and to fit with the yoke 400 without clearance in the longitudinal direction Y.

Since the magnetic latching relay has two opposite yoks 400 located at both ends of the bobbin 901, setting the number of the longitudinal limit part 2 to two can fully utilize the two yoks 400. The longitudinal limit part 2 is clamped on the yoke 400 in the longitudinal direction Y and maintains a non-clearance fit so that the fixing frame 100 can be positioned in the longitudinal direction Y. At the same time, the longitudinal limit part 2 is not directly installed on the base 200, but is installed on the yoke 400, which avoids installation deviations due to the base 200 and ensures that the fixing frame 100 is installed vertically and accurately. There is no stress between the shaft hole 13 and the rotating shaft 301 of the permanent magnet 300, so the armature 500 swings more evenly. The armature 500 and the yoke 400 have a good overlap, which can improve the electrical performance of the magnetic latching relay.

Figure 4:
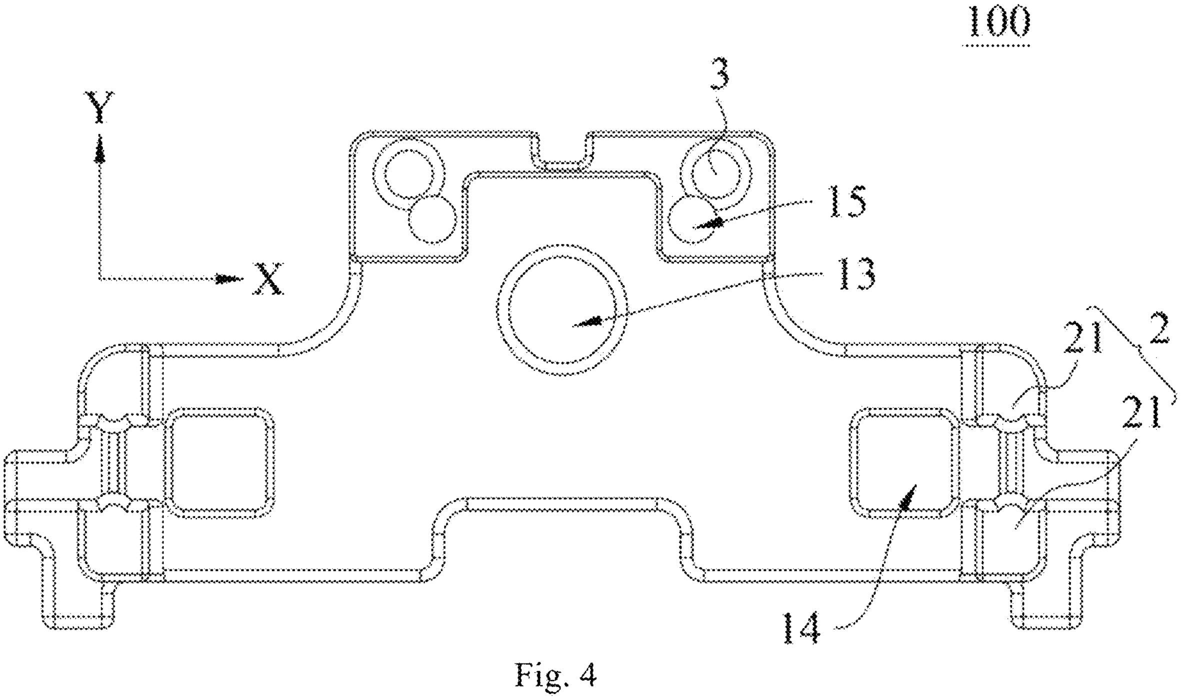
FIG. 4 is a schematic front view of the fixing frame shown in some embodiments of the present disclosure.

In some embodiments, as shown in FIGS. 1 and 4, in each longitudinal limit part 2, the opposite surfaces of two vertical limit columns 2 1 have arc-shaped convex surfaces, and one of the convex surfaces protrudes toward the other vertical limit column 2 1 so that when the two vertical limit columns 2 1 clamp the yoke 400, they can interfere fit with the yoke 400.

Figure 5:
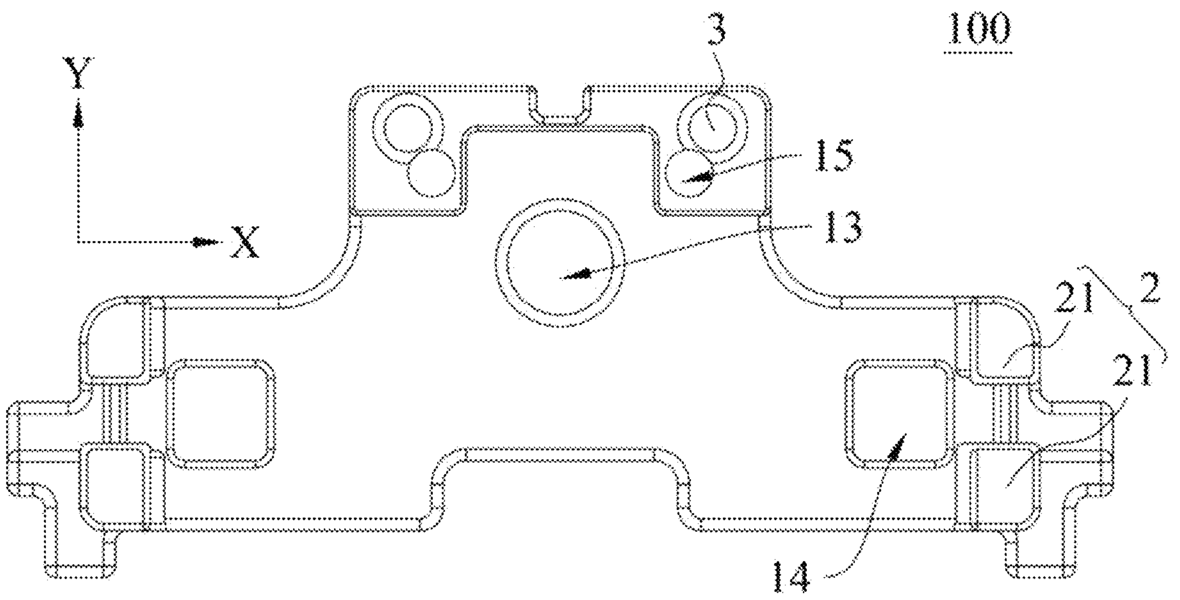
FIG. 5 is a schematic front view of the fixing frame shown in other embodiments of the present disclosure.

In some embodiments, as shown in FIG. 5, in each longitudinal limit part 2, the opposite surfaces of two vertical limit columns 2 1 are plane, so that when two vertical limit columns 2 1 clamp the yoke 400, the vertical limit columns 2 1 can interference fit with the yoke 400 or fit with the yoke 400 without clearance, and the plane can increase the contact area between the vertical limit column 2 1 and the yoke 400, so that the vertical limit column 2 1 can clamp the yoke 400 more stable.

Figure 6:
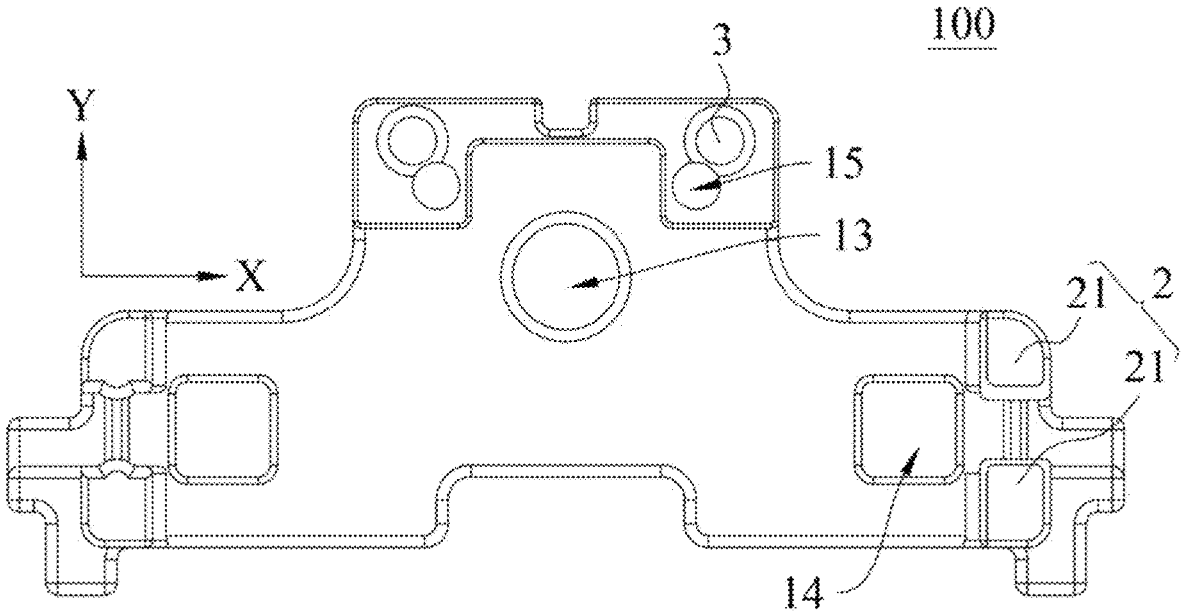
FIG. 6 is a schematic front view of the fixing frame shown in other embodiments of the present disclosure.

In some embodiments, as shown in FIG. 6, there are two longitudinal limit parts 2. In one of the longitudinal limit parts 2, the opposite surfaces of the two vertical limit columns 2 1 have arc-shaped convex surfaces, and the arc-shaped convex surface of one of the vertical limit columns 2 1 protrudes toward the other vertical limit column 2 1, so that when two vertical limit columns 2 1 clamp the yoke 400, they can interfere fit with the yoke 400. In another longitudinal limit part 2, the opposite surfaces of the two vertical limit columns 2 1 are plane, so that when two vertical limit columns 2 1 clamp the yoke 400, they can fit with the yoke 400 with zero clearance or interference fit with the yoke 400. The plane can increase the contact area between the vertical limit column 2 1 and the yoke 400, so that the vertical limit column 2 1 can clamp the yoke 400 more firmly.

In some embodiments, in each longitudinal limit part 2 1, among the opposite surfaces of the two vertical limit columns 2 1, the surface of one of vertical limit columns 2 1 has an arc-shaped convex surface, and the other vertical limit column 2 has a planar surface, which can make the longitudinal limit part 2 and the yoke 400 interference fit, and at the same time increase the contact area, making the clamping more stable.

In some embodiments, the clamped part of the yoke 400 is provided with bulges, which can make the yoke 400 and the longitudinal limit part 2 have an interference fit or a zero-clearance fit. The longitudinal limit part 2 can be any of the above embodiment.

In some embodiments, as shown in FIGS. 1 to 3 and 7, the transverse fit structure may be installation holes 201 of the base 200 of the magnetic latching relay, the transverse limit structure includes transverse limit parts 3, the transverse limit part 3 is located at one side of the body 1 along the longitudinal direction Y. The transverse limit part 3 protrudes from the first surface 11 in a direction away from the second surface 12. As shown in FIGS. 7 to 11, the transverse limit part 3 is configured to be plugged into the installation holes 201 of the base 200 of the magnetic latching relay, and fit with the installation holes 201 without clearance in the transverse direction X.

In some embodiments, the transverse limit part 3 may be a cylinder. The diameter of the cylinder is equal to or slightly larger than the size of the installation hole 201 on the base 200 along the transverse direction X, so that a non-clearance fit between the transverse limit part 3 and the installation hole 201 in the transverse direction X can be achieved.

In some embodiments, the number of the transverse limit part 3 is one. That is, there is one installation hole 201 corresponding to the transverse limit part 3 on the base 200, which can realize the positioning of the fixing frame 100 in the transverse direction X.

In some embodiments, the number of the transverse limit part 3 is multiple, and the multiple transverse limit parts 3 are provided on one side of the body 1 in the longitudinal direction Y and arranged along the transverse direction X. The number of the plurality of transverse limit parts 3 is configured to be less than or equal to the number of the installation holes 201 on the base 200 of the magnetic latching relay.

Specifically, as shown in FIG. 1, the number of the transverse limit part 3 can be two. The two transverse limit parts 3 are located on the side of the body 1 away from the transverse portion 101 in the longitudinal direction Y. The two transverse limit parts 3 are located on the longitudinal portion 102 of the body 1. Two transverse limit parts 3 are provided on both sides of the longitudinal portion 102 in the transverse direction X. As shown in FIG. 7, the base 200 of the magnetic latching relay is provided with two installation holes 201 corresponding to the two transverse limit parts 3, making the positioning of the fixing frame 100 in the longitudinal direction Y more stable.

Figure 10:
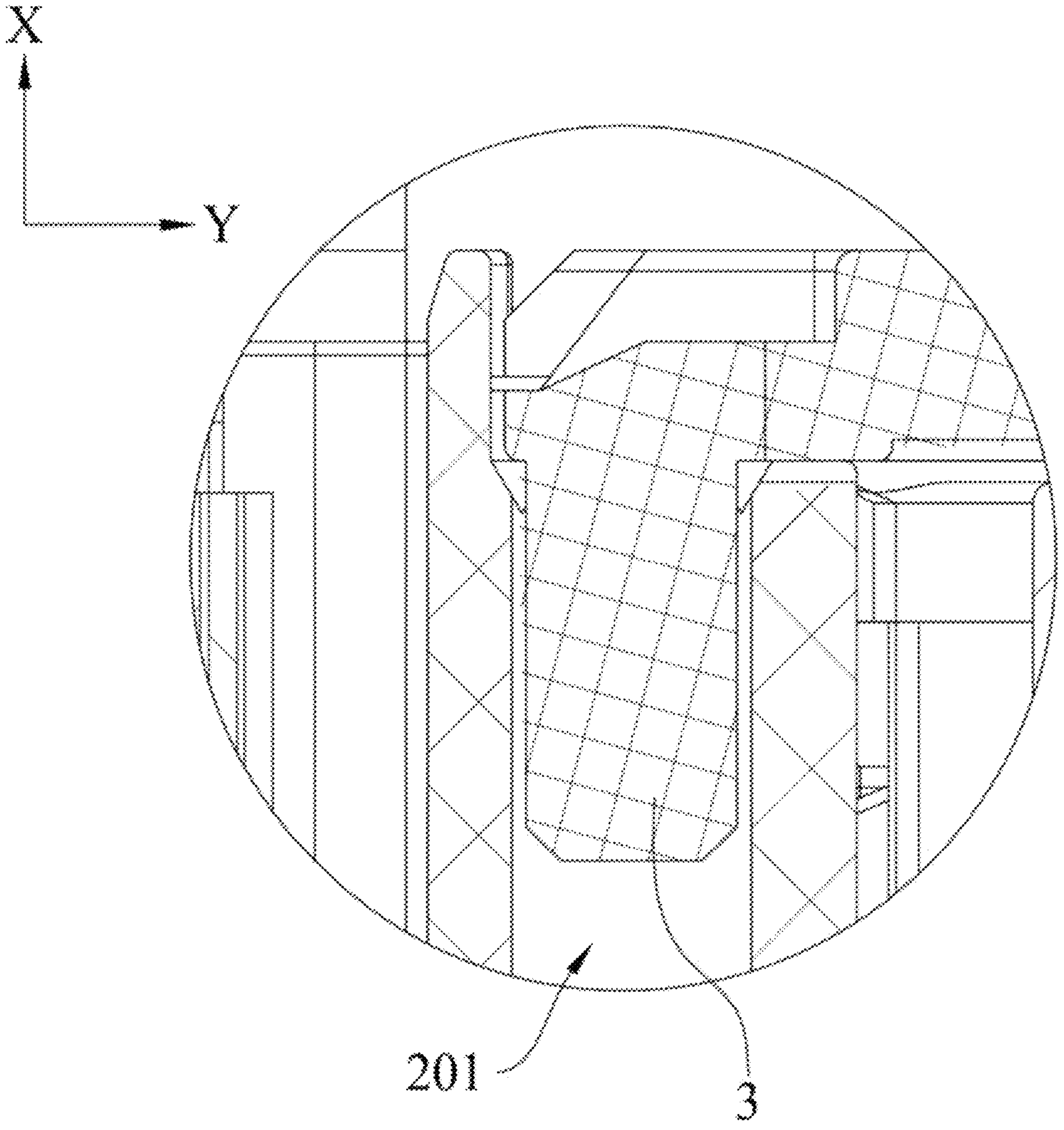
FIG. 10 is an enlarged view of D in FIG. 9.

In some embodiments, as shown in FIG. 10, the size of the transverse limit part 3 along the longitudinal direction Y is configured to be smaller than the size of the installation hole 201 of the base 200 along the longitudinal direction Y.

Specifically, when the transverse limit part 3 is a cylinder, the diameter of the cylinder is smaller than the size of the installation hole 201 along the longitudinal direction Y. In this way, the transverse limit part 3 has an activity margin in the longitudinal direction Y.

Figure 13:
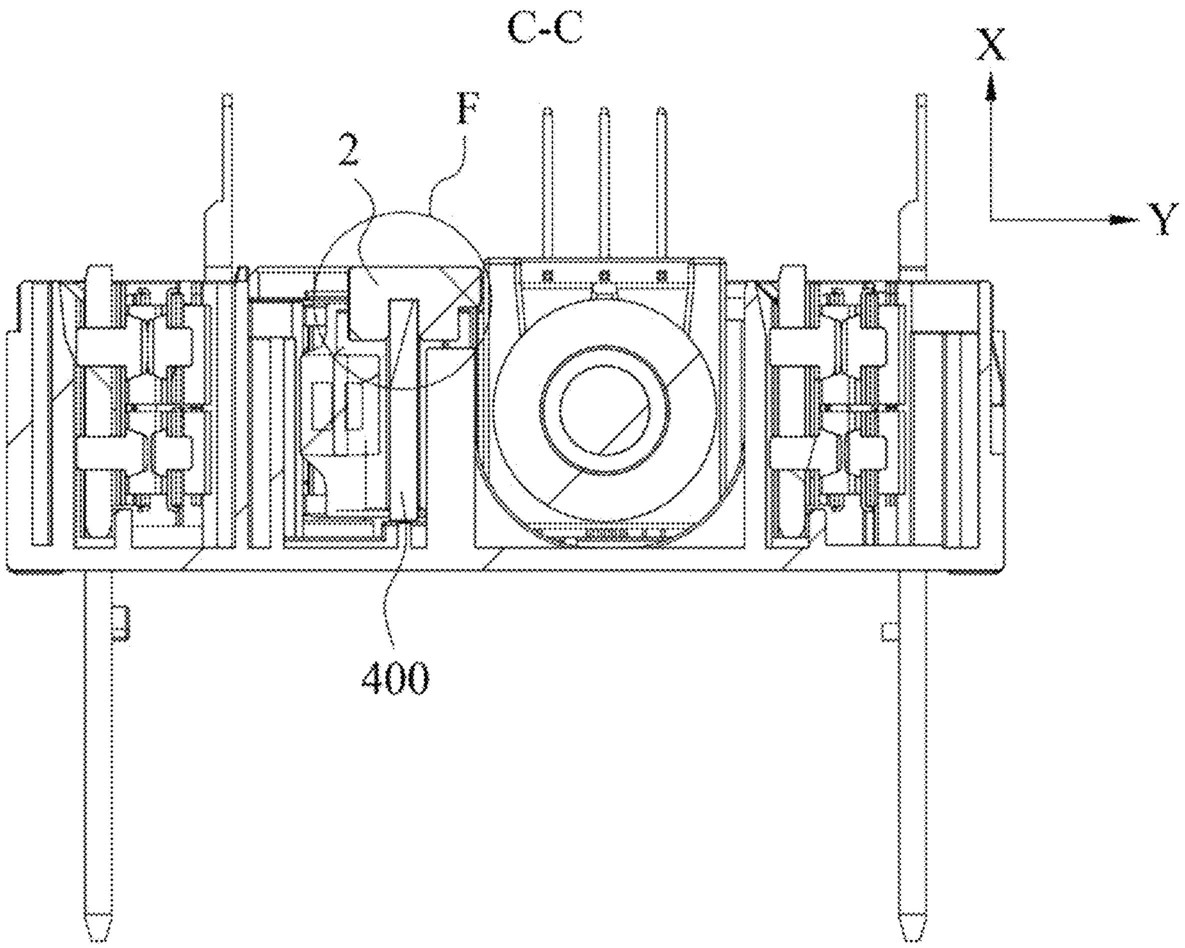
FIG. 13 is a schematic cross-sectional view along C-C in FIG. 8.
Figure 14:
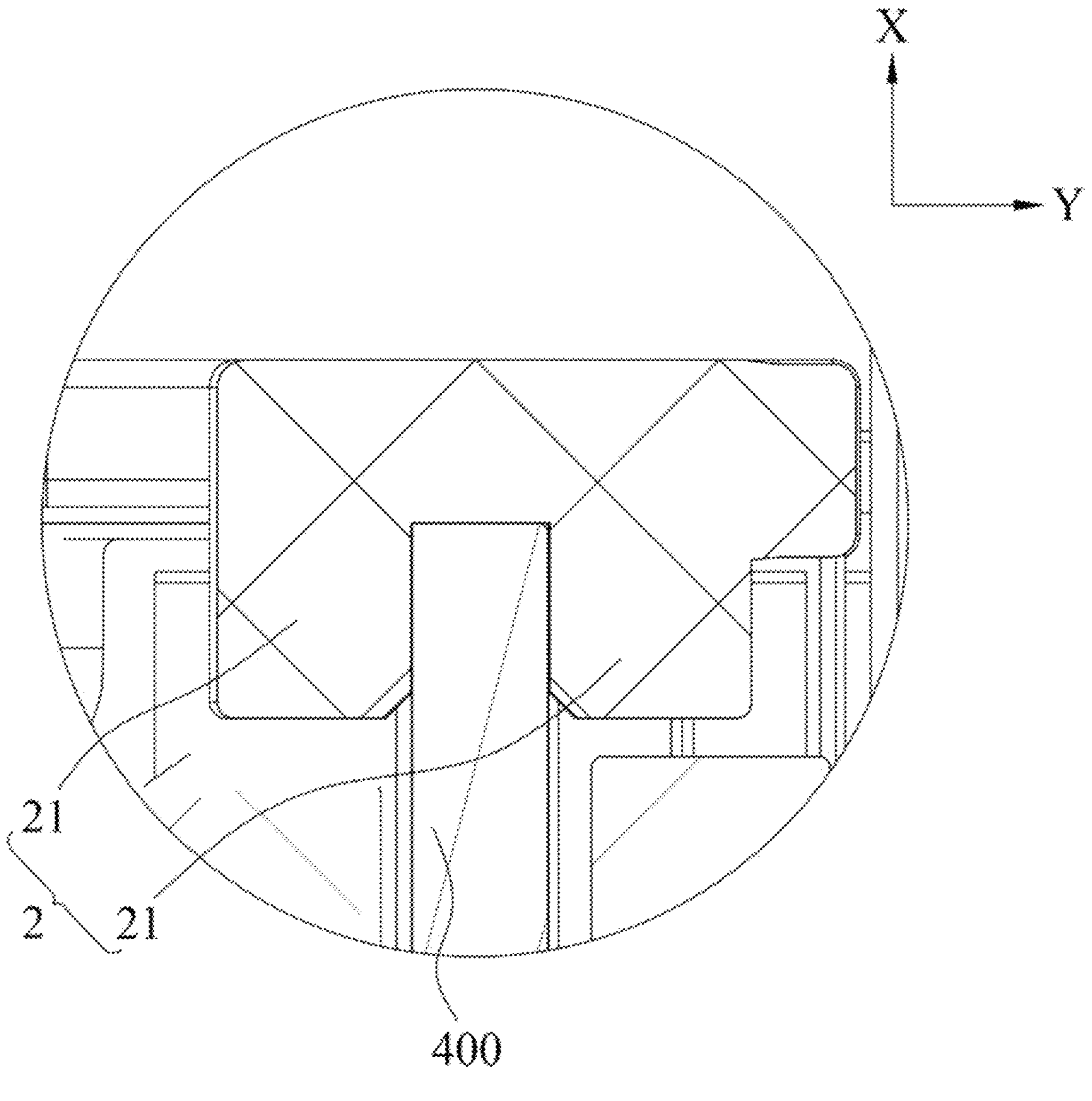
FIG. 14 is an enlarged view of F in FIG. 13.

In the embodiment of the present disclosure, the longitudinal limit part 2 enables the fixing frame 100 to be positioned in the longitudinal direction Y with an activity margin in the transverse direction X, and the transverse limit part 3 enables the fixing frame 100 to be positioned in the transverse direction X Positioned upward, there is an activity margin in the longitudinal direction Y. Therefore, the fixing frame 100 of the present disclosure can be flexibly adjusted during installation, and can be positioned and installed accurately, avoiding installation deviations due to the base 200, and allowing the rotating shaft 301 of the magnetic latching relay to rotate smoothly. In addition, as shown in FIG. 13 and FIG. 14, since the longitudinal limit part 2 can clamp the yoke 400, it is avoided to set the corresponding installation hole 201 or installation parts on the base 200, simplifying the base 200 structure, and improving manufacturing efficiency.

In some embodiments, as shown in FIGS. 1 and 3, the body 1 also has through holes 14 penetrating the first surface 11 and the second surface 12 and a glue dispensing port 15. Wherein the through hole 14 and the longitudinal limit part 2 are adjacent, the glue dispensing port 15 and the transverse limit part 3 are adjacent.

As shown in FIG. 1, in this embodiment, the through holes 14 do not have a limiting function, which can also be called anti-shrinkage holes and are located on one side of the longitudinal limit part 2. This side is one side of the longitudinal limit part 2 in the transverse direction. The through holes 14 corresponds to the middle position of the two vertical limit columns 21. After the longitudinal limit part 2 is clamped on the yoke 400, the through hole 14 can prevent the body 1 of the fixing frame 100 from deforming, and eliminate the stress caused by the slight deformation of the body 1, make the fixing frame 100 fix more firmly. The shape of the through hole 14 can be square or rectangular.

Continuing to refer to FIG. 1, the glue dispensing port 15 is located on one side of the transverse limit part 3, and the guiding channel 31 is opened on the cylinder of the transverse limit part 3. One end of the guiding channel 31 is connected to the glue dispensing port 15. The guiding channel 31 extends from the bottom of the transverse limit part 3 to the top. When dispensing glue from the glue dispensing port 15, the glue flows into the installation hole 201 of base 200 of the magnetic latching relay. So that the transverse limit part 3 is fixedly installed in the installation hole 201.

Figure 15:
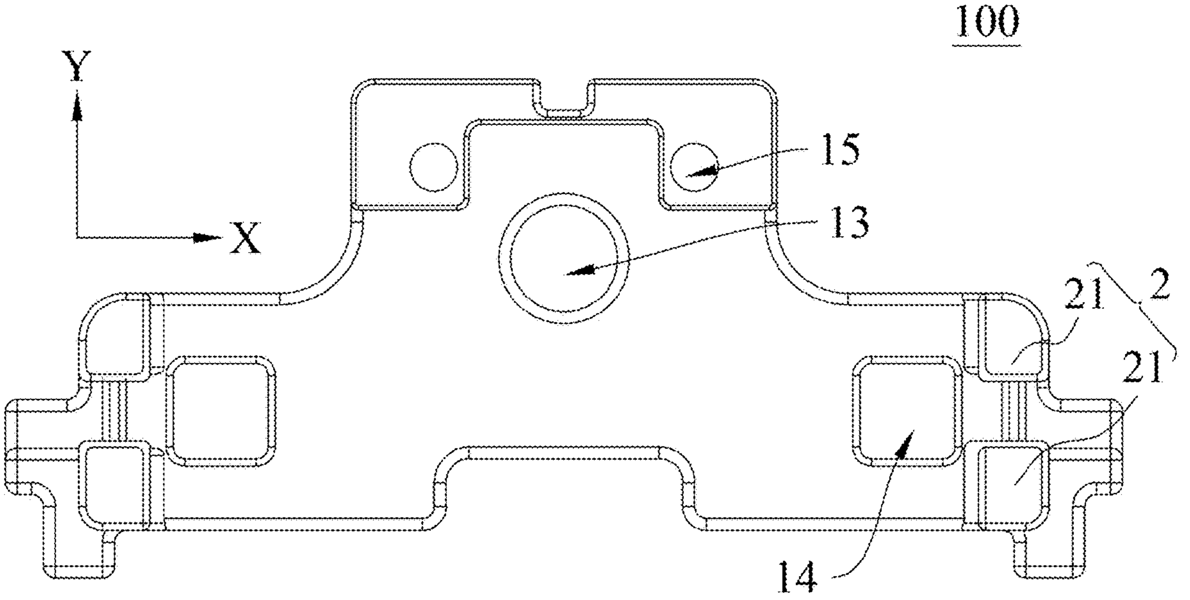
FIG. 15 is a schematic front view of the fixing frame shown in other embodiments of the present disclosure.
Figure 16:
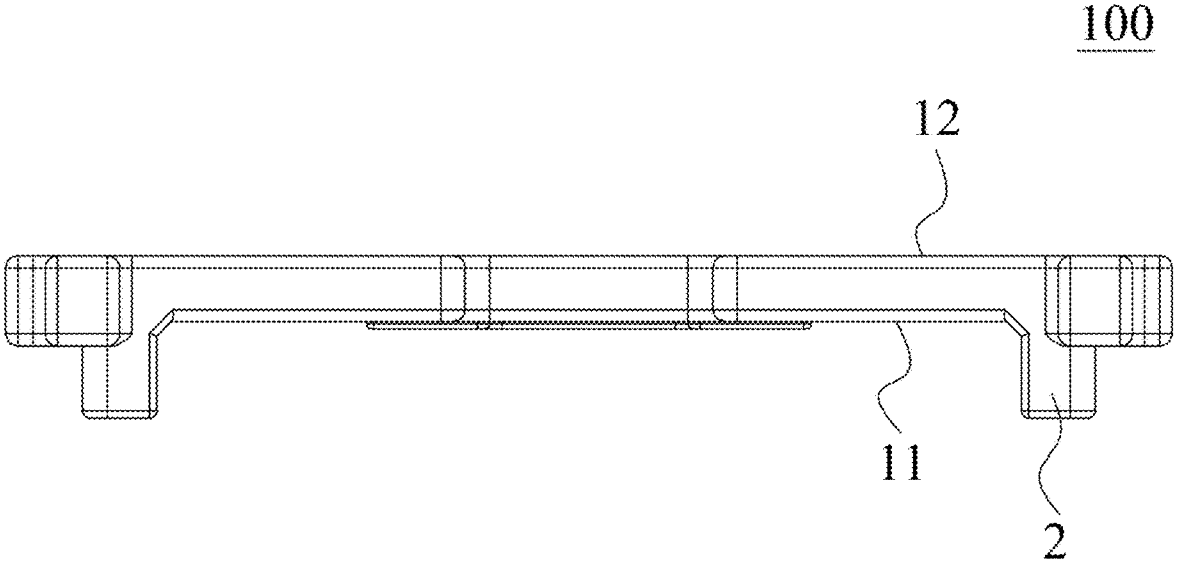
FIG. 16 is a schematic top view of the fixing frame shown in other embodiments of the present disclosure.
Figure 17:
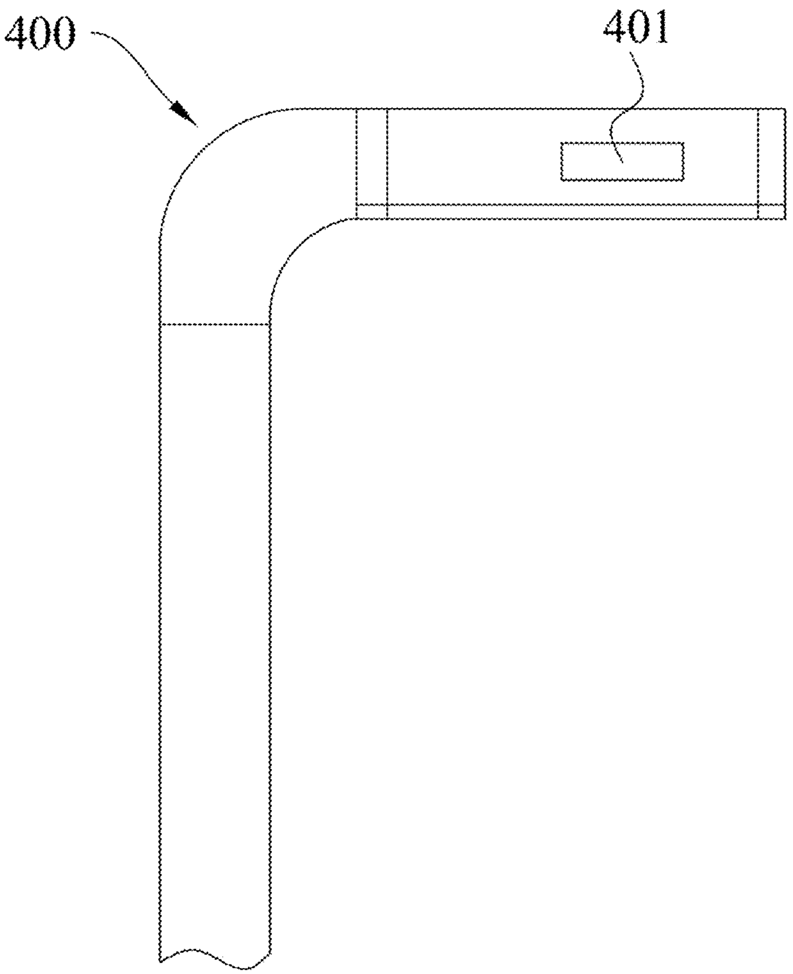
FIG. 17 is a schematic diagram of the protrusion installed on the yoke shown in other embodiments of the present disclosure.

In other embodiments, as shown in FIGS. 15 to 17, what is different from the above embodiments is that the transverse fit structure of the magnetic latching relay includes 1 protrusion 401 located on the yoke 400. When the fixing frame 100 is installed in the magnetic latching relay, the protrusion 401 protrudes toward the direction of fixing frame 100. The transverse limit structure of the fixing frame 100 includes a through hole 14 that penetrates the first surface 1 1 and the second surface 1 2 of the body 1. The through hole 14 is adjacent to the longitudinal limit part 2, and the through hole 14 is adjacent to the longitudinal limit part 2. The protrusion 401 of the yoke 400 fits in the through hole 14 without clearance in the transverse direction X.

Figure 8:
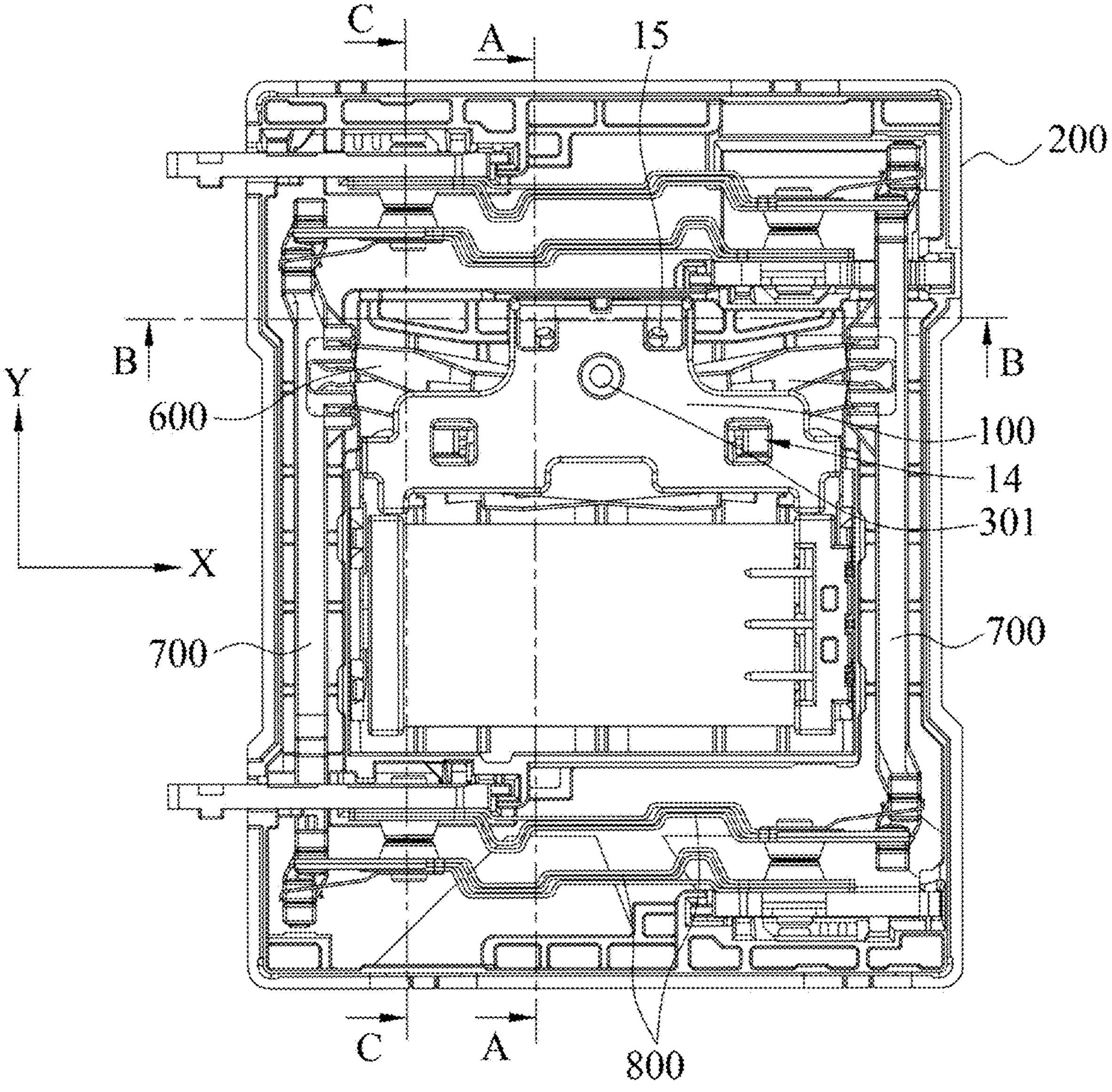
FIG. 8 is a schematic front view of the magnetic latching relay shown in some embodiments of the present disclosure.

Specifically, the through hole 14 may be the same as that described in the above embodiment, but the through hole 14 has the function of limiting the position of the fixing frame 100 in the transverse direction X under this embodiment. The yoke 400 has a protrusion 401. As shown in FIG. 8 and FIG. 1 7, when the fixing frame 100 is installed in the magnetic latching relay, the protrusion 401 protrudes from the yoke 400 towards the fixing frame 100 (from the perspective of FIG. 8 and FIG. 1 7, the protrusion in the direction perpendicular to the paper surface), and corresponds to the through hole 14 of the fixing frame 100. The protrusion 401 fits with the through hole 14 without clearance in the transverse direction. There is an activity margin in the longitudinal direction Y between the protrusion 401 and the side wall of the through hole 14, and the through hole 14 only limit the fixing frame 100 in the transverse direction X.

Therefore, in other embodiments, as shown in FIG. 15 and FIG. 16, the fixing frame 100 can omit the transverse limit part 3 in the above embodiment, thereby simplifying the structure of the fixing frame 100 and simplifying the structure of the fixing frame 100, simplifying manufacturing process and save costs. Of course, the fixing frame 100 can also retain the transverse limit part 3 so that it can be plugged into the installation hole 201 on the base 200.

In conclusion, the fixing frame 100 of the embodiment of the present disclosure is provided with at least one longitudinal limit part 2. The longitudinal limit part 2 includes two vertical limit columns 21. The vertical limit column 21 can clamp the longitudinal limit part 2 in the longitudinal direction Y. It is held on the yoke 400 and fits with the yoke 400 without clearance in the longitudinal direction Y, that is, the longitudinal limit part 2 allows the fixing frame 100 to be positioned in the longitudinal direction Y and has an activity margin in the transverse direction X. At least one transverse limit structure is provided, the transverse limit structure may include a transverse limit part 3. The transverse limit part 3 can be plugged into the installation hole 201 on the base 200 of the magnetic latching relay, and in the transverse, the transverse limit structure may fit with the installation hole 201 without clearance. The transverse limit structure may include a through hole 14, the through hole 14 may fit with the protrusion 401 of the yoke 400 without clearance in the transverse direction. That is, the transverse limit part 3 enables the fixing frame 100 to be positioned in the transverse direction X and have an activity margin in the longitudinal direction Y. Therefore, the flexible adjustment and accurate positioning of the fixed member 100 can be ensured, and when the fixed member 100 is installed on the base 200 of the magnetic latching relay, stress is avoided between the rotating shaft 301 of the permanent magnet 300 and the shaft hole 13 of the fixed member 100, thereby ensuring that the rotating shaft 301 can rotate smoothly and drive the art 500 to move, ensuring a good lap joint between the art 500 and the yoke 400, and improving the electrical performance of the magnetic latching relay.

As shown in FIGS. 7 to 14, the embodiment of the present disclosure also provides a magnetic latching relay, which includes a base 200, a permanent magnet 300, two yoks 400, a transverse fit structure and a fixing frame 100 described in any of the above embodiments.

As shown in FIG. 7, the permanent magnet 300 is installed on the base 200, and the permanent magnet 300 has a rotating shaft 301. Two yoks 400 are fixedly located on the base 200 and located on opposite sides of the permanent magnet 300. The transverse fit structure is located at the yoke 400. The fixing frame 100 includes a body 1, at least one longitudinal limit part 2 and at least one the transverse limit structure.

Among them, the body 1 has a first surface 11 and a second surface 12 that are opposite to each other, and also has a shaft hole 13 that penetrates the first surface 11 and the second surface 12. The rotating shaft 301 of the permanent magnet 300 is installed in the shaft hole 13, and can rotate in the shaft hole 13.

As shown in FIG. 1, the longitudinal limit part 2 is distributed from one side of the body 1 to the opposite side, which is opposite to the other side along the transverse direction X. The longitudinal limit part 2 includes two vertical limit columns 21 arranged in the longitudinal direction Y. The vertical limit column 21 protrudes from the first surface 11 away from the second surface 12. As shown in FIG. 13 and FIG. 14, two vertical limit columns 21 clamp the yoke 400 and fit with the yoke 400 without clearance in the longitudinal direction Y.

In some embodiments, as shown in FIG. 1, the number of the longitudinal limit parts 2 is two, which are respectively clamp two the yoks 400 oppositely arranged, and fit with the yoke 400 without clearance in the longitudinal direction Y, as shown in FIG. 14.

The transverse limit structure is located in the body and is gap-fitted with the transverse fit structure of the magnetic latching relay in the transverse direction X.

Figure 11:
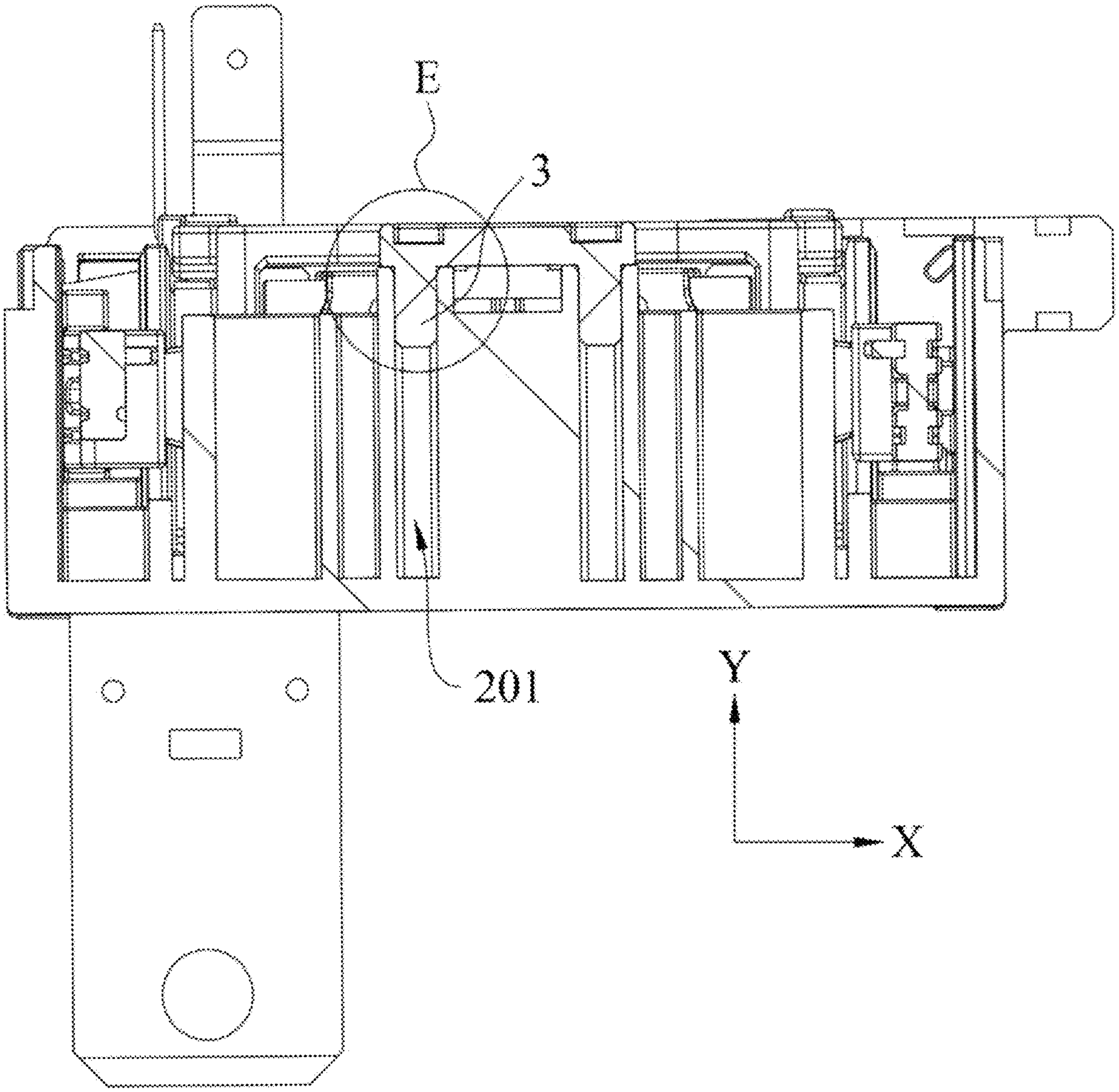
FIG. 11 is a schematic cross-sectional view along B-B in FIG. 8.
Figure 12:
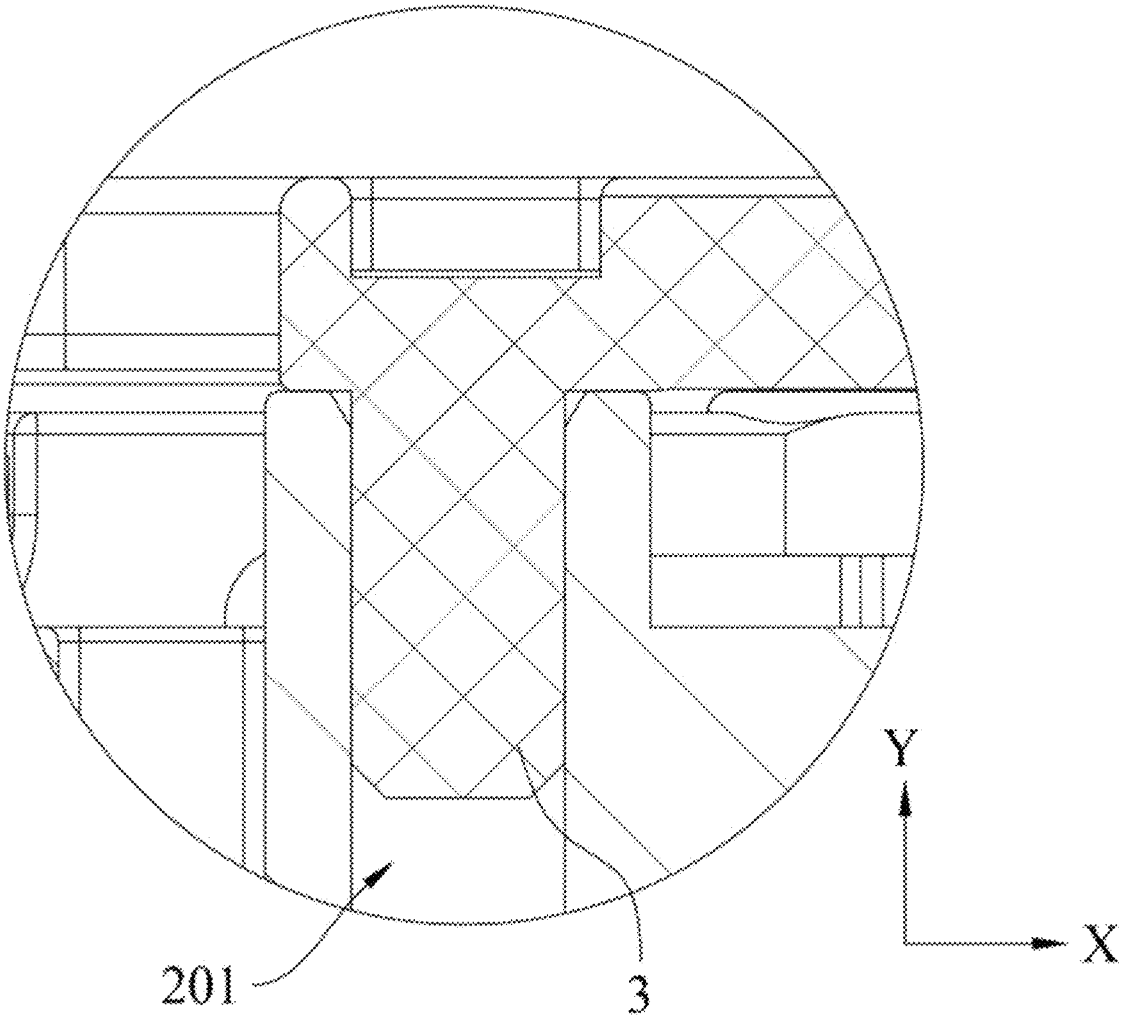
FIG. 12 is an enlarged view of E in FIG. 11.

Among them, the transverse fit structure includes installation holes 201 provided in the base 200, the transverse limit structure includes a transverse limit part 3, and the transverse limit part 3 is located at one side of the body 1 along the longitudinal direction Y, and protrudes from the first surface 11 away from the second surface 12. The transverse limit part 3 is plugged into the installation hole 201 of the base 200, and fit with the installation hole 201 without clearance, which allows the fixing frame 100 to be positioned in the transverse direction X, as shown in FIGS. 11 and 12.

In some embodiments, as shown in FIGS. 9 and 10, there is a gap between the transverse limit part 3 and the installation hole 201 in the longitudinal direction Y. That is, the transverse limit part 3 has an activity margin in the longitudinal direction Y of the installation hole 201.

In other embodiments, as shown in FIGS. 15 to 17, the transverse fit structure includes a protrusion 401 provided on the yoke 400, and a protrusion 401 protruding toward the direction of the fixing frame 100. The transverse limit structure includes a through hole 14 that penetrates the first surface 1 1 and the second surface 1 2, the through hole 14 is adjacent to the longitudinal limit part 2, and the protrusion 401 fits with the through hole 14 without clearance in the transverse direction X.

For other specific structures of the fixed member 100, please refer to the description of any embodiment of the fixed member 100, which will not be repeated here.

The magnetic latching relay can also include an armature 500. The armature 500 can be integrally injection molded with the permanent magnet 300. The armature 500 protrudes from both sides of the permanent magnet 300 and moves together with the rotating shaft 301 of the permanent magnet 300. The armature 500 overlaps the yoke 400. The one-piece injection molding of the armature 500 and the permanent magnet 300 means that after the armature 500 and the permanent magnet 300 are assembled, a high molecular polymer (such as plastic) is injected through the injection molding process to make the two fixedly connected.

In the magnetic latching relay of the embodiment of the present disclosure, the longitudinal limit part 2 of the fixing frame 100 enables the fixing frame 100 to be positioned in the longitudinal direction Y and has an activity margin in the transverse direction X. The transverse limit structure enables the fixing frame 100 to be positioned in the transverse direction X and has an activity margin in the longitudinal direction Y.

thus ensuring the flexible adjustment of the fixing frame and accurate positioning to avoid stress between the rotating shaft 301 of the permanent magnet 300 and the shaft hole 13 of the fixing frame 100, ensuring that the rotating shaft 301 can rotate smoothly and drive movement of the armature 500, ensuring a good overlap between the armature 500 and the yoke 400, and improving the relay electrical properties.

It can be understood that the various embodiments/implementations provided by the present disclosure can be combined with each other without causing conflicts, and examples will not be given one by one here.

In the embodiment of the present disclosure, the terms “first”, “second” and “third” are only used for description purposes and cannot be understood as indicating or implying relative importance; the term “plurality” refers to two or Two or more, unless otherwise expressly limited. The terms “installation”, “connection”, “connection” and “fixing” should be understood in a broad sense. For example, “connection” can be a fixed connection, a detachable connection, or an integral connection; “connection” can be Either directly or indirectly through an intermediary. For those of ordinary skill in the art, the specific meanings of the above terms in the embodiments of the present disclosure can be understood according to specific circumstances.

In the description of the embodiments of the present disclosure, it should be understood that the directions or positional relationships indicated by the terms “upper”, “lower”, “left”, “right”, “front”, “back”, etc. are based on those shown in the accompanying drawings. The orientation or positional relationship is only for the convenience of describing the embodiments of the present disclosure and simplifying the description. It does not indicate or imply that the device or unit referred to must have a specific direction, be constructed and operated in a specific orientation, and therefore, it cannot be understood as a limitation of the present disclosure. Limitations of Disclosure Embodiments.

In the description of this specification, the terms “one embodiment,” “some embodiments,” “specific embodiments,” etc., mean that a particular feature, structure, material or characteristic described in connection with the embodiment or example is included in the disclosure. In at least one embodiment or example of an embodiment. In this specification, schematic representations of the above terms do not necessarily refer to the same embodiment or example. Furthermore, the specific features, structures, materials or characteristics described may be combined in any suitable manner in any one or more embodiments or examples.

The above are only preferred embodiments of the present disclosure, and are not intended to limit the embodiments of the present disclosure. For those skilled in the art, various modifications and changes may be made to the embodiments of the present disclosure. Any modifications, equivalent substitutions, improvements, etc. made within the spirit and principles of the embodiments of the present disclosure shall be included in the protection scope of the embodiments of the present disclosure.

We claim:

1. A fixing frame for fixing at least a permanent magnet of a magnetic latching relay comprising:

a body having a first surface and a second surface opposite to the first surface, and a shaft hole penetrating the first surface and the second surface, a rotating shaft of the permanent magnet being rotatably installed in the shaft hole;

at least one longitudinal limit part arranged on the body; the longitudinal limit part comprising two vertical limit columns arranged oppositely along a longitudinal direction, the vertical limit column protrudes from the first surface away from the second surface, the two vertical limit columns being configured to clamp a yoke of the magnetic latching relay, and fit with the yoke without clearance in the longitudinal direction; and at least one transverse limit structure arranged on the body, and the transverse limit structure is configured to fit with a transverse fit structure of the magnetic latching relay without clearance in a transverse direction;

wherein the transverse direction is perpendicular to the longitudinal direction.

2. The fixing frame according to claim 1, wherein the transverse fit structure comprises an installation hole on a base of the magnetic latching relay, the transverse limit structure comprises a transverse limit part, the transverse limit part is located on one side of the body along the longitudinal direction; the transverse limit part protrudes from the first surface away from the second surface, the transverse limit part is configured to be plugged into the installation hole and fit with the installation hole without clearance in the transverse direction.

3. The fixing frame according to claim 1, wherein the transverse fit structure comprises a protrusion located on the yoke of the magnetic latching relay, when the fixing frame is installed on the magnetic latching relay, the protrusion protrudes toward the fixing frame; the transverse limit structure comprises a through hole that penetrates the first surface and the second surface, and the through hole is adjacent to the longitudinal limit part, the protrusion is configured to fit in the through hole without clearance in the transverse direction.

4. The fixing frame according to claim 1, wherein the number of the longitudinal limit part is one, the longitudinal limit part is provided on one side of the body in the transverse direction.

5. The fixing frame according to claim 1, wherein the number of the longitudinal limit parts is two, and two longitudinal limit parts are located on opposite sides of the body in the transverse direction, two longitudinal limit parts are configured to respectively clamp two yokes oppositely arranged of the magnetic latching relay, and fit with the two yokes without clearance in the longitudinal direction.

6. The fixing frame according to claim 2, wherein the number of the transverse limit parts is multiple, and the multiple transverse limit parts are located at one side of the body in the longitudinal direction, and the multiple transverse limit parts are arranged along the transverse direction; the number of the transverse limit parts is configured to be less than or equal to the installation holes on the base of the magnetic latching relay.

7. The fixing frame according to claim 2, wherein a size of the transverse limit part along the longitudinal direction is configured to be smaller than a size of the installation hole of the base along the longitudinal direction size.

8. The fixing frame according to claim 2, wherein the body also has a through hole and a glue dispensing port respectively penetrating the first surface and the second surface, wherein the through hole is adjacent to the longitudinal limit part, and the glue dispensing port is adjacent to the transverse limit part.

9. The fixing frame according to claim 2, wherein the body is T-shaped and comprises a transverse portion extending along the transverse direction and a longitudinal portion extending along the longitudinal direction from a middle of the transverse portion;

the longitudinal limit part is located on the transverse portion, and the transverse limit part is located on the longitudinal portion.

10. A magnetic latching relay, comprising:

a base;

a permanent magnet installed on the base, the permanent magnet having a rotating shaft;

two yoks fixedly installed on the base and located on opposite sides of the permanent magnet;

a transverse fit structure located on the yok; and a fixing frame, comprising:

a body having a first surface and a second surface opposite to the first surface, and a shaft hole penetrating the first surface and the second surface, a rotating shaft of the permanent magnet being rotatably installed in the shaft hole;

at least one longitudinal limit part arranged on the body; the longitudinal limit part comprising two vertical limit columns arranged oppositely along a longitudinal direction, the vertical limit column protrudes from the first surface away from the second surface, the two vertical limit columns are configured to clamp a yoke of the magnetic latching relay, and fit with the yoke without clearance in the longitudinal direction; and at least one transverse limit structure arranged on the body, and the transverse limit structure is configured to fit with a transverse fit structure of the magnetic latching relay without clearance in a transverse direction;

wherein the transverse direction is perpendicular to the longitudinal direction.

11. The magnetic latching relay according to claim 10, wherein the transverse fit structure comprises an installation hole on a base of the magnetic latching relay and a transverse limit part, the transverse limit part is located on one side of the body along the longitudinal direction; the transverse limit part protrudes from the first surface away from the second surface, the transverse limit part is configured to be plugged into the installation hole and fit with the installation hole without clearance in the transverse direction.

12. The magnetic latching relay according to claim 10, wherein the transverse fit structure comprises a protrusion located on the yok, and the protrusion protrudes toward the fixing frame;

the transverse limit structure comprises a through hole that penetrates the first surface and the second surface, the through hole is adjacent to the longitudinal limit part, the protrusion fits in the through hole without clearance in the transverse direction.

* * * * *